United States Patent [19]

Dumais et al.

[11] Patent Number: 5,017,867
[45] Date of Patent: May 21, 1991

[54] MAGNETOSTRICTIVE LINEAR POSITION DETECTOR WITH REFLECTION TERMINATION

[75] Inventors: Arthur Dumais, Rochester; Richard D. Koski, Troy, both of Mich.

[73] Assignee: MagneTek Controls, Clawson, Mich.

[21] Appl. No.: 448,164

[22] Filed: Dec. 8, 1989

[51] Int. Cl.⁵ .......................... G01B 7/14; G01B 7/26; G01F 23/30
[52] U.S. Cl. ............................. 324/207.13; 333/148; 73/290 V; 73/314; 324/207.24
[58] Field of Search ...................... 324/207.13, 207.24, 324/533; 73/290 V, 313, 314; 33/148

[56] References Cited

U.S. PATENT DOCUMENTS

| | | |
|---|---|---|
| 2,334,593 | 11/1943 | Wyckoff . |
| 2,401,094 | 5/1946 | Nicholson, Jr. . |
| 3,011,136 | 11/1961 | Scarrott . |
| 3,111,027 | 11/1963 | Moffatt et al. . |
| 3,154,946 | 11/1964 | Ordoica et al. . |
| 3,189,849 | 6/1965 | Tellerman . |
| 3,208,281 | 9/1965 | Kalmus et al. . |
| 3,225,312 | 12/1965 | Tellerman . |
| 3,290,649 | 12/1966 | Whitehouse . |
| 3,371,536 | 3/1968 | Tellerman . |
| 3,372,592 | 3/1968 | Gravert . |
| 3,413,544 | 11/1968 | Jotten et al. . |
| 3,423,673 | 1/1969 | Bailey et al. . |
| 3,492,667 | 1/1970 | Gratian . |
| 3,537,085 | 10/1970 | Mayer . |
| 3,678,750 | 7/1972 | DiNoia et al. . |
| 3,898,555 | 8/1975 | Tellerman . |
| 3,991,364 | 11/1976 | Wiznerowicz ...................... 324/533 |
| 4,006,637 | 2/1977 | Kinosita . |
| 4,028,619 | 6/1977 | Edwards . |
| 4,071,818 | 1/1978 | Krisst . |
| 4,144,519 | 3/1979 | Chamuel . |
| 4,158,964 | 6/1979 | McCrea et al. . |
| 4,236,144 | 11/1980 | Sunagawa . |
| 4,238,844 | 12/1980 | Ueda et al. . |
| 4,305,283 | 12/1981 | Reddig . |
| 4,361,037 | 11/1982 | Hauschild et al. . |
| 4,404,523 | 9/1983 | Hughes et al. ................. 324/207.13 |
| 4,503,419 | 3/1985 | Kidd et al. . |
| 4,510,587 | 4/1985 | Schneider . |
| 4,530,161 | 7/1985 | Blankinship . |
| 4,571,095 | 2/1986 | Stoffels . |
| 4,585,979 | 4/1986 | Hasselmark et al. . |
| 4,654,590 | 3/1987 | Kitaura et al. ................. 324/207.13 |
| 4,721,902 | 1/1988 | Tellerman et al. . |
| 4,726,226 | 2/1988 | Tellerman et al. . |
| 4,803,427 | 2/1989 | Mason et al. .................... 324/207.13 |
| 4,839,590 | 6/1989 | Koski et al. ................. 324/207.24 X |

FOREIGN PATENT DOCUMENTS

| | | |
|---|---|---|
| 827258 | 2/1960 | United Kingdom . |
| 896714 | 5/1962 | United Kingdom . |
| 1886079 | 3/1975 | United Kingdom . |

Primary Examiner—Gerard R. Strecker
Attorney, Agent, or Firm—Krass & Young

[57] ABSTRACT

A magnetostrictive linear displacement detector with increased position resolution includes a magnetostrictive wire anchored at opposite head and foot ends with a reflection termination at the foot end and a damping termination at the head end. A return wire is connected to the foot end of the magnetostrictive wire. The magnetostrictive wire is electrically excited at its head end. A variable position to be detected is represented by a magnet disposed for displacement along the magnetostrictive wire. A torsional motion sensor at the head end generates an electrical indication of the torsional motion within the magnetostrictive wire induced by passage of the electrical excitation by the position of the magnet. The displacement is determined from the interval of time between the detection of the torsional motion traveling directly from the magnet and the detection of the torsional motion reflected from the reflection termination. The reflection termination preferably consists of a brass cylindrical torus having a hole through which said magnetostrictive wire is passed and attached via a set screw. In an alternative embodiment the magnetostrictive wire is torsionally excited and the responses are detected electrically.

19 Claims, 3 Drawing Sheets

MAGNETOSTRICTIVE LINEAR POSITION DETECTOR WITH REFLECTION TERMINATION

TECHNICAL FIELD OF THE INVENTION

This invention relates to linear position detectors of the type including a linear magnetostrictive wire. A magnet surrounding the magnetostrictive wire marks the location to be measured. Such devices can operate with either mechanical or electrical excitation. When a torsional strain propagating along the wire reaches the area of influence of the magnet an electrical signal is generated. Conversely, when an electrical signal applied to the wire reaches the position of a magnet a torsional strain is induced which travels in both directions. Such linear position detectors are utilized, for example, as liquid level detectors and machine tool position detectors.

BACKGROUND OF THE INVENTION

The usefulness of the phenomenon of magnetostrictivity in linear distance or position measuring devices is recognized by the prior art; for example, see Redding, U.S. Pat, No. 4,305,283; McCrea et al, U.S. Pat. No. 4,158,964; Krisst, U.S. Pat. No. 4,071,818; Edwards, U.S. Pat. No. 4,028,619; and Tellerman, U.S. Pat. No. 3,898,555. Common to several of these devices are a magnetostrictive wire which runs in a straight line path through the measurement field, means for inducing a torsional strain at a given position along the wire, and a magnet which is displaceable along the wire, either by connection to a movable body such as a machine tool or by reason of association with a float device. Generally speaking, the position of the magnet represents the position of the monitored quantity and is determined as a function of the time required for a torsional disturbance to propagate from one end of the wire through the area of influence of the magnet or from the position of the magnet to a sensing apparatus located at one end of the wire.

There are problems with devices of this type. This technique depends upon accurate and repeatable measurement of time for determination of the unknown position. Time intervals are often measured via a stable clock and counter or a pulse width to voltage converter. The accuracy and resolution of such time measurements thus depends upon the stability and speed of these measurements circuits. In the case of clock and counter circuits the frequency of the clock generator is generally the limiting factor. Increased resolution of measurement generally requires more expensive circuits which operate at higher speeds and resolution. Thus there is a need in the art for a magnetostrictive linear position determination apparatus which has increased resolution without the increased expense of faster time measurement circuit.

SUMMARY OF THE INVENTION

The present application discloses a magnetostrictive linear displacement detector with increased position resolution. The displacement detector includes a magnetostrictive wire anchored at opposite ends with a reflection termination at one end for inducing reflections of torsional motion. A damping termination is placed at the other end of the magnetostrictive wire for damping reflections of torsional motion. A return wire is connected to the foot end of the magnetostrictive wire. A magnet disposed for displacement along the magnetostrictive wire is at the position to be determined.

The magnetostrictive wire is preferably electrically excited at its head end. A torsional motion sensor at the head end generates an electrical indication of the torsional motion within the magnetostrictive wire induced by passage of the electrical excitation by the position of the magnet. The displacement is determined from the interval of time between the detection of the torsional motion traveling directly from the magnet and the detection of the torsional motion reflected from the reflection termination. This is in accordance with the equation:

$$D = T - \frac{\Delta t \, R}{2}$$

where D is the distance to be measured, T is the total length of the magnetostrictive wire between the reflection termination and the torsional motion sensor, $\Delta t$ is the measured interval of time between detection of the direct and reflected torsional motion; and R is the rate of torsional motion within the magnetostrictive wire. The increased resolution comes from the use of the direct and reflected returns for position determination.

A further advantage of this technique is the substantial cancelation of delays in the detection circuit. This occurs because the quantity measured is the difference between two similar detections using the same circuits.

The reflection termination preferably consists of a cylindrical torus having a hole. The magnetostrictive wire is passed through the hole and attached. This attachment is preferably via a set screw disposed perpendicular to the hole. The reflection termination is formed of a nonmagnetic material such as brass.

The torsional motion sensor may take two forms. The first form is piezoelectric and includes a first elastomeric material, a piezoelectric crystal, a second elastomeric material and a clamping means frictionally holding the magnetostrictive wire to the piezoelectric crystal between the first and second elastomeric materials. Torsional motion within the magnetostrictive wire shears the opposed faces of the piezoelectric crystal thereby inducing an electrical signal. The second form is magnetic and preferably includes a magnetic coil having at least one pole disposed in close proximity and at right angles to the magnetostrictive wire.

In an alternative embodiment the magnetostrictive wire is torsionally excited and the responses are detected electrically. This results in a first electrical signal generated when the torsional excitation passes the position of the magnet and a second electrical signal when the torsional excitation passes the position of the magnet after reflection from the reflection termination. The above mentioned advantages apply equally well to this alternative technique.

BRIEF DESCRIPTION OF THE DRAWINGS

These and other objects and aspects of the present invention will become clear from the following description of the invention, in which.

DETAILED DESCRIPTION OF THE PREFERRED EMBODIMENT

Figure 1:
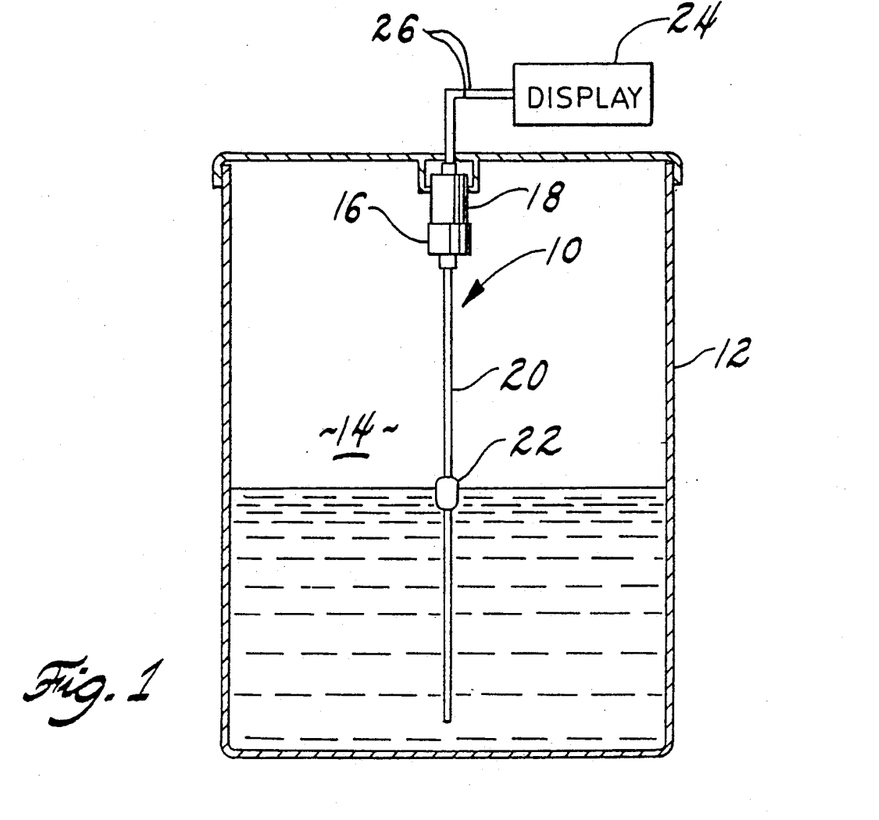
FIG. 1 is a cutaway side view of a liquid level detector embodying the present invention.

Referring to FIG. 1 there is shown a liquid level measurement device 10 disposed in fixed relationship within a tank 12 for fluid 14 such as gasoline, the level of which may vary from empty to a full condition near the top of tank 12. In FIG. 1 tank 12 is slightly less than half full. Device 10 comprises a head portion 16 having a fluid tight cap 18 which protects certain electronic components hereinafter described, a stainless steel tube 20 which extends vertically through tank 12 and through the fluid level measurement field which, in this case, is from a point near the bottom of tank 12 to a point close to but spaced approximately 8 to 12 inches from the top of tank 12; i.e., normal maximum fluid level is such that head 16 and cap 18 are not normally submerged. Mounted on tube 20 for sliding displacement therealong is a float 22 which contains a circular magnet for purposes hereinafter described. The signal processing electronic components in head 16 are connected to a suitable display 24 by means of low voltage wire 26. Display 24 may be a simple gauge or a more sophisticated data processing system having inventory control programming, periodic report printouts and so forth.

Figure 2:
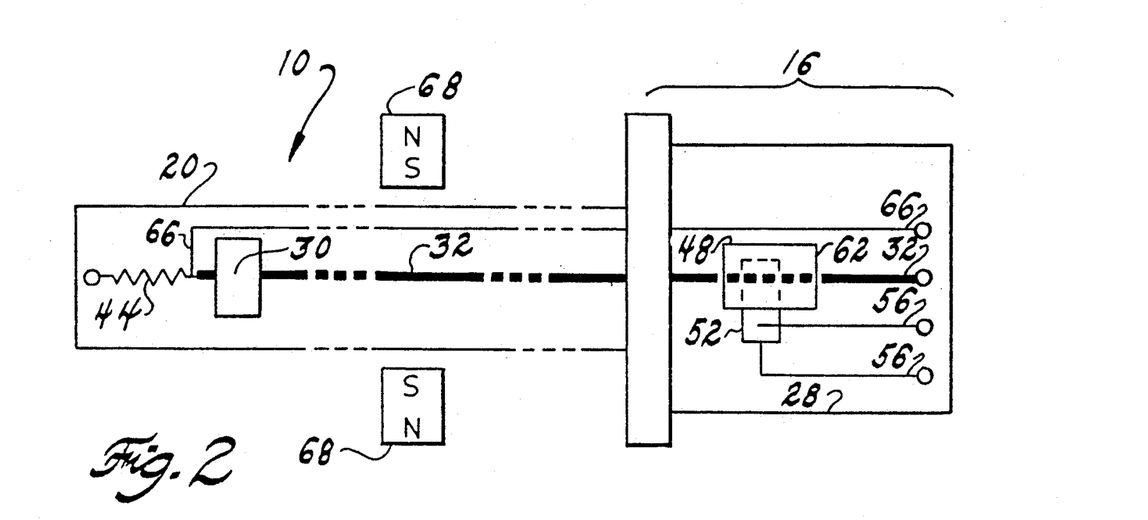
FIG. 2 is a schematic view of the present invention illustrating a first embodiment of a transducer suitable for use in the present invention.

FIG. 2 illustrates in schematic form details of the mechanical and electromechanical components of device 10. Head 16 is illustrated with cap 18 removed. A steel base plate 28 is connected in a centered position to accommodate certain electronic components hereinafter described and to provide a structure for the mounting of a magnetostrictive wire 32. Magnetostrictive wire 32 is preferably formed of nickel/iron alloy; a material known as Nispan C is suitable. Wire 32 runs straight through the center of tube 20 and is secured at the head end by solder to a terminal on an insulative pad (not shown) which is secured base plate 28. Wire 32 extends through a hollow center of head 16 and, as previously mentioned, through the center of tube 20 along substantially the entire length thereof. At the foot end wire 32 is secured by means of a tension spring 44 to the foot end of tube 20. Wire 32 is held in spaced relationship relative to the interior walls of tube 20 by means of rubber spacers (not shown) which may occur at regular or irregular intervals along the entire length of tube 20. There is essentially no limit on the length of tube 20; i.e., transducers of 40 feet in length are just as feasible as those of only a few feet in length. Spring 44 ensures proper tension in the wire so that it runs straight and parallel through tube 20. Further details of the construction of a suitable device 10 may be found in Koski et al, U.S. Pat. No. 4,839,590, which is assigned to the same assignee as this application.

Figure 3:
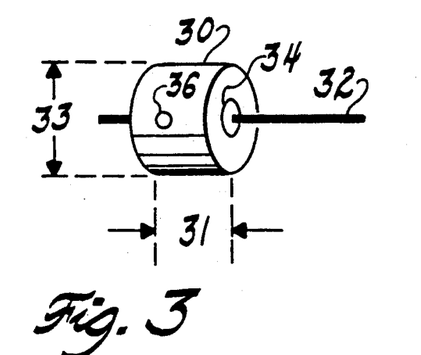
FIG. 3 is a perspective view of the reflection collar illustrated in FIG. 1.

A reflection collar 30 is secured to wire 32 at the foot end. Reflection collar 30, which is illustrated in greater detail in FIG. 3, preferably consists of a cylindrical torus formed of a nonmagnetic material such as brass. Reflection collar 30 has a bore 34 sized to accommodate wire 32. In the preferred embodiment wire 32 has a diameter of approximately 0.025 inches. Reflection collar 30 preferably has a length 31 of 0.25 inches and a diameter 33 of 0.25 inches. In use, wire 32 is passed through the bore 34 for attachment to spring 44. Reflection collar 30 is secured to wire 32 via set screw 36 which is disposed perpendicular to bore 34. Reflection collar 30 provides a mass discontinuity on wire 32 which serves to reflect torsional strain arriving at the foot end of tube 20 back toward the head end. Reflection collar 30 is formed in this fashion to accommodate spring 44 for providing tension on wire 32. If spring 44 is not required to provide tension on wire 32, then the reflection termination can be any rigid mounting of wire 32. The utility of such reflections will be detailed below.

A transducer 48 is provided in mechanical contact with wire 32 near the head end. Transducer 48 may impart a torsional strain to wire 32 upon receipt of an electrical command or may generate an electrical signal upon detection of a torsional strain. As will be described, transducer 48 preferably operates to detect torsional strain.

Figure 4:
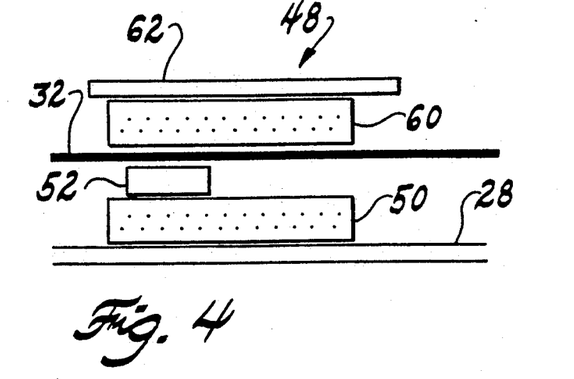
FIG. 4 is a sectional view of the transducer illustrated in FIG. 2.

As better illustrated in FIG. 4, transducer 48 comprises a silicone rubber pad 50 which rests on a surface of base plate 28 under wire 32. A small rectangular piezoelectric crystal 52 rests on pad 50 provides a seat for wire 32. Piezoelectric crystal 52 includes plating which allows signal wires 56 (see FIG. 2) to be electrically connected to opposite faces. Wire 32 rests on a portion of piezoelectric crystal 52 free of this plating. A second silicone rubber pad 60 is placed on top of wire 32 after it is seated on the exposed, non-conductive portion of piezoelectric crystal 52 and a metal clamp plate 62 is held in place by any suitable means to clamp wire 32 down onto piezoelectric crystal 52. Note that transducer 48 with silicone rubber pads 50 and 60 serves to damp any propagating torsional strain received from the foot end, thereby minimizing reflections.

Piezoelectric crystal 52 operates as a bidirectional transducer. When a propagating torsional strain arrives at transducer 48, the top face of piezoelectric crystal 52 is sheared relative to its bottom face. This induces a voltage across these faces which is sensed by signal wires 56 attached to the opposite faces. Conversely, when a voltage is applied across the faces by means of signal wires 56, piezoelectric crystal 52 expands longitudinally; i.e., in the direction which is transverse to wire 32. In combination with the clamp effect produced by components pads 50 and 60, base plate 28 and clamp plate 62, the expansion of piezoelectric crystal 52 acts like a rack and pinion arrangement to roll wire 32 and impart a localized torsional strain. This torsional strain thereafter propagates along wire 32 from the head end toward the foot end.

The foot end of wire 32 is electrically connected to a fine copper signal return wire 66 which passes in parallel spaced relationship to magnetostrictive wire 32 and through tube 20. The signal return wire 66 is connected to the electronics of device 10. Principal electronic components of device 10 are hereinafter described with reference to FIGS. 7 and 8.

Finally, a circular magnet 68 having radially arranged north and south poles is slidably disposed around tube 20 so that it may move along the length of tube 20 over the measurement range. Magnet 68, in the case of a liquid level detector, is contained within the fluid tight float 22 as shown in FIG. 1. Alternatively magnet 68 may be attached to a machine tool or other mechanical components whose position over a predetermined range is to be monitored.

Figure 5:
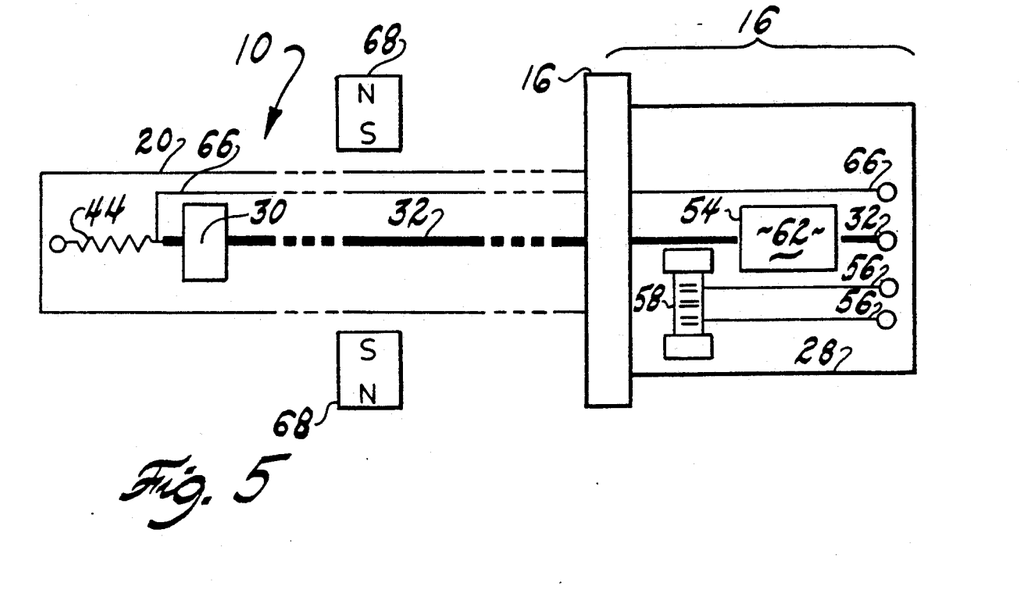
FIG. 5 is a schematic view of the present invention illustrating an alternative embodiment of a transducer suitable for use in the present invention.

FIG. 5 illustrates an alternative construction of head 16 in which transducer 48 is embodied by coil 58. The propagating torsional strain on wire 32 can be sensed as a moving magnetic disturbance. Coil 58 is a small bobbin of high frequency ferrite material which is wound with copper wire. The particular winding should be selected to match the impedance of the electrical system connected to coil 58. Coil 58 is disposed with a small gap, such as 0.010 inches, between wire 32 and its core. The arrival of the propagating torsional strain at the location of coil 58 is accompanied by a moving magnetic disturbance. This moving magnetic disturbance induces a voltage within coil 58. This induced voltage can be sensed by electronic components in a known manner. Conversely, any change in the electrical current in coil 58 causes a changing magnetic field in wire 32. This induces a torsional strain to wire 32 which propagates in both directions.

Transducer 48 may include a single pole coil 58 as illustrated in FIG. 5 or it may include a more complex multipole structure with magnetic core gaps. Since transducer 48 in this case detects a moving magnetic disturbance in wire 32, other magnetic detectors such as Hall effect devices or magnetoresistive devices may be employed. Note that it has been found that no magnetic bias is necessary to detect the moving magnetic disturbance within wire 32. On the contrary, any magnetic bias tends to interfere with the detection process.

FIG. 5 further illustrates a damping device 54 attached to the head end of wire 32. This damping device 54 includes a clamp plate 62 and silicone rubber pads 50 and 60 clamped to wire 32 in a manner similar to that illustrated in FIG. 4, except that piezoelectric crystal 52 is omitted. Damping device 54 serves to substantially absorb any propagating torsional strain received from the foot end and prevent reflections. This damping device 54 is needed because the magnetic disturbance detector of FIG. 5 provides much less damping of wire 32 than the transducer 48 illustrated in FIG. 4. The reason for damping such reflections will be explained below.

The operation of the magnetostrictive linear displacement detector involves the interaction between wire 32 and magnet 68. In the preferred embodiment, an electrical pulse is applied to the series combination of wire 32 and return wire 66. This electrical pulse preferably has a relatively short duration of approximately 5 microseconds. When this electrical signal reaches the position of magnet 68, a localized torsional strain is imparted to wire 32 by the interaction of this electrical pulse and the magnetic field of magnet 68. This localized torsional strain propagates along wire 32 toward both the head and the foot ends at a known rate. A typical propagation rate for devices used for liquid level detection is about 9.3 microseconds per inch. The torsional strain propagating toward the head end is detected by transducer 48. The torsional strain propagating toward the foot end is reflected by reflection collar 30 and travels back to the head end where it is also detected by transducer 48 at a later time. The length of time between the arrival of the direct and reflected torsional strains is a function of the position of magnet 68 which, in the illustrated case, is a function of liquid level. In the orientation shown in FIG. 1, higher liquid levels result in longer timing intervals. It is a relatively simple matter to convert this timing interval into a signal quantity representing the position of magnet 68 along tube 20. The position of magnet 68, in turn, represents liquid level or other monitored quantity. The provision of a reflection damping termination at the head end of wire 32 serves to prevent any further reflected propagating torsional strain from interfering with this interval detection.

The magnetostrictive linear position detector can also operate in the converse situation. In this case, transducer 48 imparts a localized torsional strain to wire 32 in a manner previously described. This localized torsional strain propagates along wire 32 toward the foot end at the known rate. As the torsional disturbance passes through the area of influence of magnet 68, it induces a voltage having the waveform of a damped sine wave in wire 32. This voltage travels at near the speed of light through wire 32 and through signal return wire 66 to an electric sensor circuit (illustrated in FIG. 8). The torsional strain further propagates to the end of wire 32 and is reflected by reflection collar 30. In due course this reflected torsional strain also reaches the position of magnet 68, thereby inducing a second electrical pulse which is also detected by the electrical pulse detector. The interval between the detection of these two pulses is employed in the same manner as described above. The reflection damping termination at the head end of wire 32 prevents any further reflections of the torsional strain.

The impartation of an electrical pulse with detection of induced torsional strain is preferred for two reasons. Firstly, the application of electrical signals to wire 32 serves a de-gausing function. Otherwise, magnet 68 may induce some residual magnetism in a part of wire 32. This residual magnetism may cause hysteresis errors if magnet 68 is moving, particularly when magnet 68 reverses its direction. Secondly, the preferred operation reduces electrical noise in the detection. Coupling an electrical detector to wire 32 results in a considerable effective antenna which can receive induced voltages. On the other hand, a torsional strain detector is relatively small and can be easily shielded from induced voltages.

Figure 7:
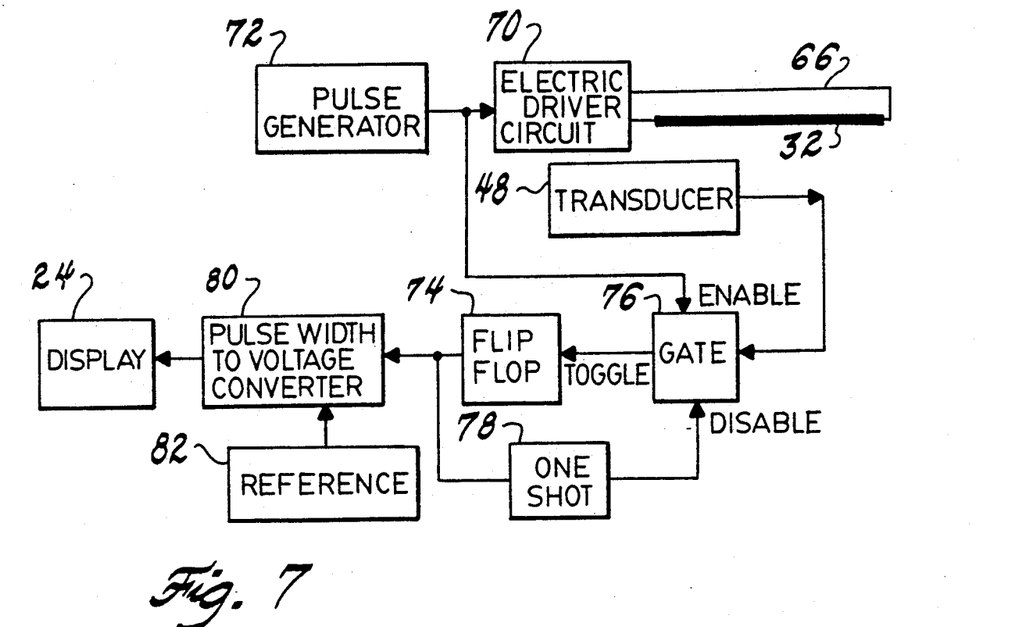
FIG. 7 is a block diagram of the electronics in accordance with a first embodiment of the present invention.

Referring now to FIG. 7, a block diagram of the preferred electronic system will be described. Pulse generator 72 produces electrical pulses of known and stable duration. In the case of electrical excitation of wire 32 this duration is approximately 5 microseconds. The pulse generator 72 may be actuated by a clock signal or upon demand as suits the system designer. The time between pulses produced by pulse generator 72 must be at least as great as the time required for torsional strain to travel from nearest position magnet 68 can travel toward the head end of wire 32 to reflection collar 30 located at the foot end and hence back to transducer 48. If transducer 48 is very near the head end of wire 32, this duration is generally time for the torsional strain to make one round trip from the head end to the foot end of wire 32. Pulse generator 72 produces a pulse which is applied to electric driver circuit 70 to impart an electrical pulse on the series combination of wire 32 and return wire 66. The output of pulse generator 72 is also connected to the enable input of gate 76, thereby permitting gate 76 to pass signals applied to its input.

Transducer 48 is coupled to wire 32 to detect the arrival of propagating torsional strain. The detection of the first torsional strain directly from magnet 68 is passed through gate 76 (which was previously enabled via pulse generator 72) to change the state of a bistable device such as a flip-flop 74 to mark the beginning of a measured timing interval. The detection of the second torsional strain reflected from reflection collar 30 is also passed through gate 76 to return flip-flop 74 to its original state and mark the end of the timing interval.

One shot 78 is connected the output of flip-flop 74. One shot 78 is constructed to generate a pulse of a predetermined duration upon detection of return of the output of flip-flop 74 to its original state. This pulse is supplied to the disable input of gate 76, thereby closing this gate until it is enabled by the next pulse from pulse generator 72. Thus gate 76 is enabled only during the interval between generation of the pulse by pulse generator 72 and the reception of the second torsional strain by transducer 48. This serves to prevent the generation of extraneous position signals.

Flip-flop 74 thus produces a pulse having a width equal to the timing signal interval; i.e., equal to the time interval between the receipt of the first pulse from transducer 48 and the receipt of the second pulse from transducer 48. Flip-flop 74 supplies this timing interval to a pulse width to voltage convertor 80. The pulse width to voltage connector 80 may take several forms including the form of a high frequency digital pulse counter whereby the number of accumulated pulses during the timing interval is representative of liquid level. Alternatively device 80 may comprise a ramp voltage generator receiving a closely controlled voltage from reference source 82 and appropriate sample-and-hold circuitry for determining the amplitude that the ramp voltage achieves during the timing interval. In any event the output of converter 80 is connected to remote display 24 which, as previously described, may vary in sophistication over a wide range.

Figure 8:
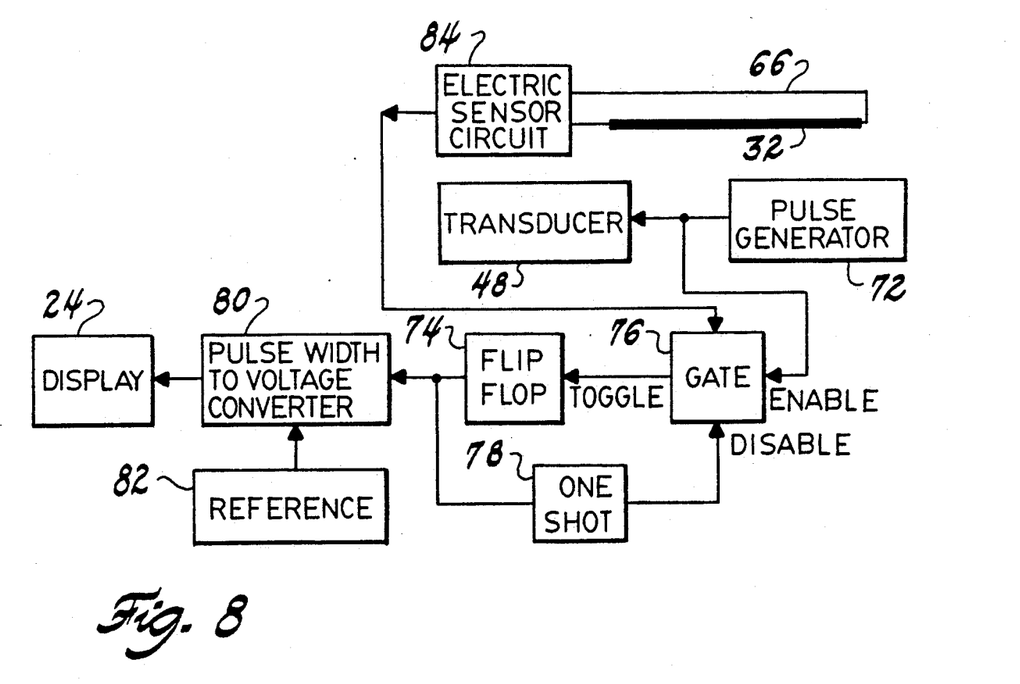
FIG. 8 is a block diagram of the electronics in accordance with an alternative embodiment of the present invention.

FIG. 8 illustrates the electronics components in accordance with an alternative embodiment. In FIG. 8, pulse generator 72 triggers transducer 48 to produce a torsional strain pulse on the head end of wire 32. When this torsional strain reaches magnet 68, and when the torsional strain reflected from reflection collar 30 reaches magnet 68 electrical pulses in the form of a damped sine wave are produced. These are detected by electric sensor circuit 84 which supplies an output to gate 76. Other aspects of FIG. 8 are identical to FIG. 7.

Figure 6:
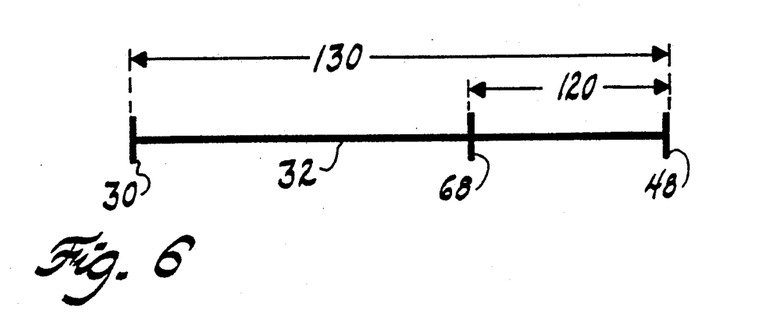
FIG. 6 is a simplified view of the present invention illustrating quantities employed in the description of the invention.

The technique of the present invention increases the distance resolution obtainable with the same timing accuracy as compared with the prior art. This improvement in resolution will be explained with reference to FIG. 6. Note that while the following description deals with the case of electrical excitation and mechanical detection, the same time intervals are involved in the case of mechanical excitation and electrical detection. Referring now to FIG. 6, let the distance 120 from transducer 48 to magnet 68 be D and the distance 130 from transducer 48 to reflection collar 30 be T. Also let $R_e$ and $R_m$ be the respective rates of electrical and torsional propagation within wire 32.

The time $t_1$ from the generation of an electrical pulse along wire 32 to the receipt of the direct torsional strain is given by:

$$t_1 = \frac{D}{R_e} + \frac{D}{R_m} + \Delta t_1 \tag{1}$$

representing the time of propagation of the electrical pulse to magnet 68 and the time of propagation of the torsional strain back to transducer 48 and where $\Delta t_1$ is the inherent delay time of the electronic system. Note this ignores any small difference in distance between the location of the electrical excitation and the location of transducer 48. Solving (1) for D we find that:

$$D = \frac{R_e R_m}{R_e + R_m}(t_1 - \Delta t_1) \tag{2}$$

From the prior discussion $R_m$ is approximately 9.3 microseconds per inch. The rate of electrical propagation $R_e$ is near the speed of light or about 85 picoseconds per inch. Thus $R_e$ is approximately one hundred thousand times greater than $R_m$. Equation (2) can thus be approximated as:

$$D = R_m(t_1 - \Delta t_1) \tag{3}$$

The rate of change of D with respect to a unit change in $t_1$ is computed from equation (3) as:

$$\frac{dD}{dt_1} = R_m \tag{4}$$

indicating the resolution is proportional to the rate of propagation of the torsional strain.

The present invention employs the time of receipt of a torsional strain reflected from reflection collar 30.

The time $t_2$ from the generation of an electrical pulse along wire 32 to the receipt of the reflected torsional strain is given by:

$$t_2 = \frac{D}{R_e} + \frac{T-D}{R_m} + \frac{T}{R_m} + \Delta t_2 \tag{5}$$

representing the time of propagation of the electrical pulse to magnet 68, the time of propagation of the torsional strain to reflective collar 30, the time of propagation of the reflected torsional strain from reflective collar 30 back to transducer 48, and where $\Delta t_2$ is the inherent delay time in the electronics system.

In accordance with this invention, the distance D is determined from the time interval between the detection of the direct and reflected torsional strains. This time interval $t_3$ is $t_2$ minus $t_1$ given by:

$$t_3 = \left( \frac{D}{R_e} + \frac{T-D}{R_m} + \frac{T}{R_m} + \Delta t_2 \right) - \left( \frac{D}{R_e} + \frac{D}{R_m} + \Delta t_1 \right) \tag{6}$$

We can assume that the circuit delay does not change appreciably between these torsional strain detections and therefore $\Delta t_1 = \Delta t_2$. Simplifying equation (6) we have:

$$t_3 = \frac{2T}{R_m} - \frac{2D}{R_m} \quad (7)$$

Note that all the terms including $R_e$ cancel out in equation (7). Thus removal of the dependency on $R_e$ does not require resort to an approximation. Solving equation (7) for D we have:

$$D = T - \frac{R_m t_3}{2} \quad (8)$$

The rate of change of D with respect to a unit change in $t_3$ is computed from equation (8) as:

$$\frac{dD}{dt_3} = -\frac{R_m}{2} \quad (9)$$

indicating the rate of change of D with a unit change in $t_3$ is half of that indicated by equation (4). Thus the present invention provides greater resolution by employing the time interval between the receipt of the direct and reflected torsional strain pulses. Note also the effect of any circuit delays are minimized based upon the subtraction of two similar detections.

In the foregoing discussion it has been assumed that the damping terminations is at the head end of wire 32 and the reflector termination at the foot end. This arrangement can be reversed with the same advantages over the art. In this case the transducer illustrated in FIG. 5 is preferred because it does not damp wire 32.

What is claimed is:

1. A magnetostrictive linear displacement detector comprising:
   a magnetostrictive wire anchored at opposite head and foot ends and defining a measurement interval therebetween;
   a reflection termination mechanically coupled to said magnetostrictive wire at said foot end placing a predetermined mechanical impedance to torsional motion on said magnetostrictive wire for inducing reflections of torsional motion;
   a damping termination mechanically coupled to said magnetostrictive wire at said head end for preventing reflections of torsional motion;
   a return wire having a foot end electrically coupled to said foot end of said magnetostrictive wire and a head end;
   a magnet disposed for displacement along the said magnetostrictive wire within said measurement interval, the position of said magnet within said measurement interval being the linear displacement detected;
   an electrical excitation means electrically coupled to said head end of said magnetostrictive wire and said head end of said return wire for producing a predetermined electrical excitation through said magnetostrictive wire and said return wire; and
   a torsional motion sensor disposed proximate to said head end of said magnetostrictive wire for generating an electrical indication of torsional motion within said magnetostrictive wire.

2. A magnetostrictive linear displacement detector comprising:
   a magnetostrictive wire anchored at opposite head and foot ends and defining a measurement interval therebetween;
   a cylindrical torus disposed proximate said foot end of said magnetostrictive wire having a hole along its axis through which said magnetostrictive wire is passed and attached, said cylindrical torus forming a reflection termination placing a predetermined mechanical impedance to torsional motion on said magnetostrictive wire for inducing reflections of torsional motion;
   a damping termination mechanically coupled to said magnetostrictive wire at said head end for damping reflections of torsional motion;
   a return wire having a foot end electrically coupled to said foot end of said magnetostrictive wire and a head end;
   a magnet disposed for displacement along the said magnetostrictive wire within said measurement interval, the position of said magnet within said measurement interval being the linear displacement detected;
   an electrical excitation means electrically coupled to said head end of said magnetostrictive wire and said head end of said return wire or producing a predetermined electrical excitation through said magnetostrictive wire and said return wire;
   a torsional motion sensor disposed proximate to said head end of said magnetostrictive wire for generating an electrical indication of torsional motion within said magnetostrictive wire; and
   a displacement determination means connected to said electrical excitation means and said torsional motion sensor for detecting the position of said magnet within said measurement interval of said magnetostrictive wire from the interval of time between the detection of the torsional motion within said magnetostrictive wire induced by said electrical excitation traveling directly to said torsional motion sensor and the detection of the torsional motion within said magnetostrictive wire induced by said electrical excitation traveling to said reflection termination and then reflected back to said torsional motion sensor following each electrical excitation of said magnetostrictive wire and said return wire.

3. The magnetostrictive linear displacement detector as claimed in claim 2, wherein:
   said cylindrical torus further includes a set screw disposed perpendicular to said hole for attachment to said magnetostrictive wire.

4. The magnetostrictive linear displacement detector as claimed in claim 2, wherein:
   said cylindrical torus is formed of a nonmagnetic material.

5. The magnetostrictive linear displacement detector as claimed in claim 4, wherein:
   said nonmagnetic material of said cylindrical torus is brass.

6. The magnetostrictive linear displacement detector as claimed in claim 2, wherein:
   said torsional motion sensor includes of a first elastomeric material, a piezoelectric crystal, a second elastomeric material and a clamping means fictionally holding said magnetostrictive wire to said piezoelectric crystal between said first and second elastomeric materials, whereby torsional motion within said magnetostrictive wire shears opposed faces of said piezoelectric crystal thereby inducing an electrical signal within said piezoelectric crystal.

7. The magnetostrictive linear displacement detector as claimed in claim 2, wherein:

said torsional motion sensor consists of a magnetic disturbance detector disposed near said magnetostrictive wire for detection of magnetic disturbance at right angles to said magnetostrictive wire and having no magnetic bias.

8. The magnetostrictive linear displacement detector as claimed in claim 7, wherein:

said magnetic disturbance detector includes a magnetic coil having at least one pole disposed at right angles to and in close proximity with a predetermined point of said magnetostrictive wire.

9. The magnetostrictive linear displacement detector as claimed in claim 2, wherein:

said displacement determination means determines the position of said magnet within said measurement interval from the equation $$D = T - \frac{\Delta t \, R}{2}$$

where D is the distance to be detected, T is the total length of said magnetostrictive wire from said reflection termination to said torsional motion sensor, $\Delta t$ is the measured interval of time between the detection of the torsional motion within said magnetostrictive wire induced by said electrical excitation traveling directly to said torsional motion sensor and the detection of the torsional motion within said magnetostrictive wire induced by said electrical excitation traveling to said reflection termination and then reflected back to said torsional motion sensor, and R is the rate of torsional motion within said magnetostrictive wire.

10. A magnetostrictive linear displacement detector comprising:

a magnetostrictive wire anchored at opposite head and foot ends and defining a measurement interval therebetween;

a reflection termination mechanically coupled to said magnetostrictive wire at said foot end placing a predetermined mechanical impedance to torsional motion on said magnetostrictive wire for inducing reflections of torsional motion;

a damping termination mechanically coupled to said magnetostrictive wire at said head end for preventing reflections of torsional motion;

a return wire having a foot end electrically coupled to said foot end of said magnetostrictive wire and a head end;

a magnet disposed for displacement along the said magnetostrictive wire within said measurement interval, the position of said magnet within said measurement interval being the linear displacement detected;

a torsional motion excitation means disposed proximate to said head end of said magnetostrictive wire for imparting a predetermined torsional motion within said magnetostrictive wire; and an electrical excitation detection means electrically coupled to said head end of said magnetostrictive wire and said head end of said return wire for detecting an electrical signal through said magnetostrictive wire induced by the passage of torsional motion within said magnetostrictive wire by the position of said magnet.

11. A magnetostrictive linear displacement detector comprising:

a magnetostrictive wire anchored at opposite head and foot ends and defining a measurement interval therebetween;

a cylindrical torus disposed proximate said foot end of said magnetostrictive wire having a hole along its axis through which said magnetostrictive wire is passed and attached, said cylindrical torus forming a reflection termination placing a predetermined mechanical impedance to torsional motion on said magnetostrictive wire for inducing reflections of torsional motion;

a damping termination mechanically coupled to said magnetostrictive wire at said head end for damping reflections of torsional motion;

a return wire having a foot end electrically coupled to said foot end of said magnetostrictive wire and a head end;

a magnet disposed for displacement along the said magnetostrictive wire within said measurement interval, the position of said magnet within said measurement interval being the linear displacement detected;

a torsional motion excitation means disposed proximate to said head end of said magnetostrictive wire for imparting a predetermined torsional motion within said magnetostrictive wire;

an electrical excitation detection means electrically coupled to said head end of said magnetostrictive wire and said head end of said return wire for detecting an electrical signal through said magnetostrictive wire and said return wire induced by the passage of torsional motion within said magnetostrictive wire by the position of said magnet; and a displacement determination means connected to said torsional motion excitation means and said electrical excitation detection means for determining the position of said magnet within said measurement interval of said magnetostrictive wire from the interval of time between the detection of the induced electrical signal within said magnetostrictive wire and return wire by said torsional motion traveling directly to said magnet and the detection of the induced electrical signal within said magnetostrictive wire and said return wire by said torsional motion traveling to said reflection termination and reflected back to said magnet following each torsional excitation of said magnetostrictive wire.

12. The magnetostrictive linear displacement detector as claimed in claim 11, wherein:

said cylindrical torus further includes a set screw disposed perpendicular to said hole for attachment to said magnetostrictive wire.

13. The magnetostrictive linear displacement detector as claimed in claim 11, wherein:

said cylindrical torus is formed of a nonmagnetic material.

14. The magnetostrictive linear displacement detector as claimed in claim 13, wherein:

said nonmagnetic material of said cylindrical torus is brass.

15. The magnetostrictive linear displacement detector as claimed in claim 11, wherein:

said torsional motion excitation means includes of a first elastomeric material, a piezoelectric crystal, a second elastomeric material and a clamping means fictionally holding said magnetostrictive wire to said piezoelectric crystal between said first and second elastomeric materials, whereby an electrical signal applied to said piezoelectric crystal moves said magnetostrictive wire transverse to its length thereby inducing a torsional motion within said magnetostrictive wire.

16. The magnetostrictive linear displacement detector as claimed in claim 11, wherein:
said torsional motion excitation means includes a magnetic coil having at least one pole disposed at right angles to and near a predetermined point of said magnetostrictive wire and having no magnetic bias.

17. The magnetostrictive linear displacement detector as claimed in claim 11, wherein:
said displacement determination means determines the position of said magnet within said measurement interval from the equation $$D = T - \frac{\Delta t\, R}{2}$$

where D is the distance to be detected, T is the total length of said magnetostrictive wire from said reflection termination to said torsional motion excitation means, $\Delta t$ is the measured interval of time between the detection of the induced electrical signal within said magnetostrictive wire and return wire by said torsional motion traveling directly to said magnet and the detection of the electrical signal within said magnetostrictive wire and said return wire by said torsional motion traveling to said reflection termination and reflected back to said magnet following each torsional excitation of said magnetostrictive wire, and R is the rate of torsional motion within said magnetostrictive wire.

18. The magnetostrictive linear displacement detector as claimed in claim 2, further comprising:
a spring coupled to said foot end of said magnetostrictive wire for providing a predetermined tension on said magnetostrictive wire.

19. The magnetostrictive linear displacement detector as claimed in claim 11, further comprising:
a spring coupled to said foot end of said magnetostrictive wire for providing a predetermined tension on said magnetostrictive wire.

* * * * *

UNITED STATES PATENT AND TRADEMARK OFFICE
CERTIFICATE OF CORRECTION

PATENT NO. : 5,017,867

DATED : May 21, 1991

INVENTOR(S) : Arthur Dumais, et al.

It is certified that error appears in the above-identified patent and that said Letters Patent is hereby corrected as shown below:

Column 7, line 33, "connector" should be --converter--.

Column 26, line 8, "or" should be --for--.

Signed and Sealed this

Nineteenth Day of January, 1993

*Attest:*

DOUGLAS B. COMER

*Attesting Officer*  *Acting Commissioner of Patents and Trademarks*